United States Patent

[11] 3,621,026

[72] Inventors Klaus Gutsche;
Eberhard Schroder, both of Berlin, Germany
[21] Appl. No. 786,548
[22] Filed Dec. 19, 1968
[45] Patented Nov. 16, 1971
[73] Assignee Schering AG. of Berlin
Bergkamen and Berlin, Germany
[32] Priority Dec. 30, 1967
[33] Germany
[31] P 16 95 855.7

[54] BLOOD-SUGAR-LOWERING SULFONYLAMINO PYRIMIDINES
13 Claims, No Drawings
[52] U.S. Cl.................................................. 260/256.5 R,
260/543 R, 260/556 AR, 424/251
[51] Int. Cl...................................................... C07d 51/36
[50] Field of Search....................................... 260/256.5

[56] References Cited
UNITED STATES PATENTS
3,377,351  4/1968  Haack et al.................. 260/256.5

Primary Examiner—Alex Mazel
Assistant Examiner—R. J. Gallagher
Attorney—Joseph F. Padlon ABSTRACT: Sulfonylamino pyrimidine derivatives of the formula

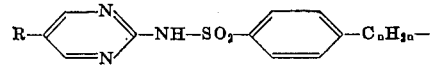

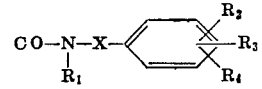

wherein R is lower alkyl, lower alkoxy, lower-alkoxy-lower-alkoxy, cycloalkyl or cycloalkoxy having five or six carbon atoms, or phenyl;
$R_1$ is hydrogen or lower alkyl;
$R_2$, $R_3$, and $R_4$ are members of the group consisting of hydrogen, lower alkyl, lower alkoxy, lower alkanoyl, lower alkanoyl-amino, trifluoromethyl, halogen, aminocarbonyl, benzyloxy, lower alkenyloxy, and phenyl;
$n$ is 1 or 2; and
X is a carbon-to-carbon bond or $CH_2$,
and the salts of the derivatives with physiologically tolerated bases lower the blood sugar level in warm-blooded animals.

BLOOD-SUGAR-LOWERING SULFONYLAMINO PYRIMIDINES

This invention relates to sulfonamides, and particularly to sulfonamides capable of lowering the blood sugar level in warm-blooded animals.

Such sulfonamides have been found in sulfonylamino pyrimidine derivatives of the formula

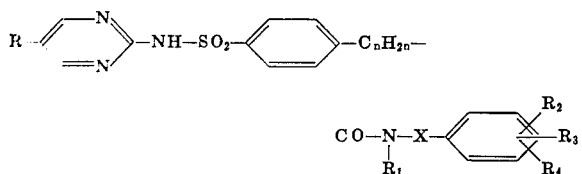

wherein R is lower alkyl, lower alkoxy, lower-alkoxy-lower-alkoxy, cycloalkyl or cycloalkoxy having five or six carbon atoms, or phenyl;

$R_1$ is hydrogen or lower alkyl;

$R_2$, $R_3$, and $R_4$ are members of the group consisting of hydrogen, lower alkyl, lower alkoxy, lower alkanoyl, lower alkanoylamino, trifluoromethyl, halogen, aminocarbonyl, benzyloxy, lower alkenyloxy, and phenyl;

$n$ is 1 or 2; and

X is a carbon-to-carbon bond or $CH_2$, and the salts of these derivatives with physiologically tolerated bases.

The compounds of the invention are prepared by methods which are not novel in themselves and will presently become apparent.

The new compounds are distinguished in comparison with the structurally similar and known 2-benzenesulfonamido-5-methoxy-ethoxy-pyrimidine by a blood-sugar-lowering action increased by a multiple in oral application at approximately equal toxicity. The following table 1 shows the strong efficacy of the new compounds with reference to some selected examples. At an applied dose of 2 mg./kg., the reference substance (2-benzenesulfonamido-5-methoxy-ethoxy-pyrimidine) is ineffective. The new compounds show in part still good efficacy even at a dose of only 0.5 mg./kg.

The new compounds show also in man an excellent blood-sugar-lowering action after oral application, as table 2 shows with reference to two examples.

Especially effective are those compounds of the first general formula above, wherein W is a direct C—C bond or an oxygen atom, X is a direct C—C bond, Y is a $CH_2$ group, Z is a hydrogen atom or a methyl group, A is a benzene nucleus, R, R', R'' hydrogen atoms, chlorine atoms, alkyl or alkoxy groups with one–six carbon atoms, and R''' is an alkyl group with one–six carbon atoms or a phenyl group.

The new substances should be administered preferably in doses of about 0.01–1 mg./kg.

For therapeutic use, the substances according to the invention can be administered as free sulfonamides, as salts with physiologically acceptable inorganic and/or organic bases such as sodium, lithium, calcium, ammonium hydroxide, amines like methyl glucamine, morpholine, ethanolamine, and others, or also in the form of mixtures of free sulfonamides with a suitable alkali-hydrogen carbonate or a carbonate. Especially suitable are bases which themselves have a blood-sugar-lowering action, as for example, butyl biguanide. The preparation of the substances can be effected without or with the additions customary in galenic pharmacy, of vehicles, tests, correctants and the like, and in powder form, as tablets, dragees, capsules, pills, suspensions or solutions.

TABLE 1

| | Substance | Dose, mg./kg. | Blood sugar in percent of initial concentration in rabbits after oral administration following fasting for 24 hours, after (hours)— | | | | |
|---|---|---|---|---|---|---|---|
| | | | 1 | 2 | 16 | 18 | 20 |
| 1 | 4-(5-isopropoxypyrimidinyl-2)-sulfonamidophenyl acetic acid-(2-methoxy-5-chloranilid) (sodium salt). | 2 | 79.4 | 72.2 | 55.0 | 58.0 | 56.0 |
| 2 | 4-(5-methoxypyrimidinyl-2)-sulfonamidophenyl acetic acid-(2-methoxy-5-chloranilid) (free acid). | 2 | 87.8 | 67.2 | 64.0 | 66.0 | 65.6 |
| 3 | 4-(5-methoxypyrimidinyl-2)-sulfonamidophenyl acetic acid-(2-methyl-5-chloranilid) (sodium salt). | 2 | 90.0 | 77.0 | 73.4 | 79.2 | 81.2 |
| 4 | 4-(5-isopropoxypyrimidinyl-2)-sulfonamidophenyl acetic acid-(2-methyl-5-chloranilid) (sodium salt). | 2 | 89.2 | 73.6 | 62.6 | 65.0 | 66.6 |
| 5 | 4-(5-isobutylpyrimidinyl-2)-sulfonamidophenyl acetic acid-(2-methoxy-5-chloranilid) (sodium salt). | 2 | 70.8 | 67.6 | 57.8 | 60.4 | 60.3 |
| 6 | 4-(5-methylpyrimidinyl-2)-sulfonamidophenyl acetic acid-(2-methoxy-5-chloranilid) (sodium salt). | 2 | 100.0 | 89.8 | 72.4 | 70.8 | 67.6 |
| 7 | 4-(5-isopropoxypyrimidinyl-2)-sulfonamidophenyl acetic acid-(2-methyl-6-chloranilid) (sodium salt). | 2 | 90 | 79 | 80 | 92 | 99 |
| 8 | 4-(5-isopropylpyrimidinyl-2)sulfonamidophenyl acetic acid-(2-methoxy-5-chloranilid) (sodium salt). | 1 | 85 | 61 | 79 | 83 | 83 |
| 9 | 4-(5-isopropylpyrimidinyl-2)-sulfonamidophenyl acetic acid-(3-chloro-6-methylanilid (sodium salt). | 4 | 87 | 80 | 53 | 60 | 67 |
| 10 | 4-(5-ethylpyrimidinyl-2)-sulfonamidophenyl acetic acid-(2-methoxy-5-chloranilid) (sodium salt). | 1 | 80 | 71 | 62 | 79 | 79 |

TABLE 2

| Substance | Dose, mg./kg. | Test persons | Blood sugar in percent of initial concentration after (hours)— | | | | | | |
|---|---|---|---|---|---|---|---|---|---|
| | | | ½ | 1 | 2 | 3 | 4 | 6 | 8 |
| 4-(5-isopropoxypyrimidinyl-2)-sulfonamidophenyl acetic acid-(2-methoxy-5-chloranilid). | [1] 0.1 | 3 | 78 | 65 | 80 | 85 | 81 | 86 | 82 |
| | [1] 0.05 | 4 | 102 | 78 | 89 | 91 | 90 | 87 | 92 |
| | [2] 0.25 | 3 | 100 | 96 | 93 | 95 | 87 | 83 | 83 |
| | [2] 0.1 | 4 | 101 | 92 | 87 | 86 | 89 | 91 | 90 |
| 4-(5-isobutylpyrimidinyl-2)-sulfonamidophenyl acetic acid-(2-methoxy-5-chloranilid) (sodium salt). | 0.1 | 4 | 90 | 63 | 70 | 79 | 85 | 79 | 81 |
| | 0.05 | 4 | 93 | 70 | 80 | 84 | 87 | 86 | 88 |

[1] No salt.   [2] Free acid.

EXAMPLES OF PREPARATION

EXAMPLE 1

Forty g. of 4-(guanidinosulfonyl)-phenyl acetic acid-(2,6-dichlor-anilid) are added to a solution of 2.5 g. of sodium and 16 g. of alpha-n-propoxy-beta-dimethylaminoacrolein in 300 ml. of methyl glycol. The mixture is stirred for 8 hours at 70° C. Then the methyl glycol is distilled off under vacuum and the residue admixed with 500 ml. of water. The cloudy solution obtained is clarified with charcoal and the substance precipitated with hydrochloric acid. After recrystallization of the obtained precipitate, one obtains 36 g. of 4-(5-n-propoxypyrimidinyl-2)-sulfonamidophenyl acetic acid-(2,6-dichloranilid) having a melting point of 228° C.

EXAMPLE 2

Thirty-five g. of 4-chlorsulfonylphenyl acetic acid-(3-acetylanilid) are added to a solution of 15 g. of 2-amino-5-isobutylpyrimidine in 100 ml. of pyridine. The mixture is heated for 2 hours to 50° C. and then the reaction product is precipitated by addition of 300 ml. of water. The precipitate is suctioned off and recrystallized from alcohol. One thus obtains 32 g. of 4-(5-isobutylpyrimidinyl-2)-sulfonamidophenyl acetic acid-(3-acetylanilid) having a melting point of 260° C.

EXAMPLE 3

Thirty-eight g. of 4-aminosulfonylphenyl acetic acid-(3-trifluoro-methyl-anilid)-sodium and 16 g. of 2-chloro-5-isobutylpyrimidine are dissolved in 300 ml. of dimethyl formamide and stirred for 3 hours at 150° C. Thereafter, the dimethyl formamide is distilled off and the residue stirred with 500 ml. of water. The precipitate is suctioned off and recrystallized from ethanol. One obtains 26 g. of 4-(5-isobutylpyrimidinyl-2)-sulfonamido-phenyl acetic acid-(3-trifluoromethylanilid) having a melting point of 115° C.

When using 20 g. of 2-methylsulfonyl-5-isobutylpyrimidine instead of the 2-chloro-5-isobutylpyrimidine, with an otherwise equal procedure, the product is obtained in the same yield.

EXAMPLE 4

Twenty-six g. of 4-(5-isopyrimidinyl-2)-sulfonamido-phenyl acetic acid-(2-methyl-5-chloranilid) are heated at 130° C. in the autoclave for 6 hours with a solution of 2.5 g. of sodium in 250 ml. of methanol in the presence of 5 g. of $Cu_2O$. Thereafter, the methanol is distilled off, the residue admixed with 500 ml. of water, and the copper oxide filtered off. From the filtrate, the product of the process is precipitated with hydrochloric acid. One obtains 19 g. of 4-(5-methoxypyrimidinyl-2)-sulfonamidophenyl acetic acid-(2-methyl-5-chloranilid), which after recrystallization from alcohol melts at 215° C.

EXAMPLE 5

Thirty-five g. of 4-(5-isobutylpyrimidinyl-2)-sulfonamidophenyl acetic acid are stirred at room temperature for 3 hours in 250 ml. of chloroform with 50 ml. of thionyl chloride. The excess thionyl chloride and chloroform are distilled off. The residual 4-(5-isobutylpyrimidinyl-2)-sulfonamidophenyl acetic acid chloride is boiled with refluxing for 3 hours with a solution of 20 g. of aniline in 250 ml. of chloroform. The chloroform is distilled off and the residue is mixed with 300 ml. of water. The precipitate obtained is recrystallized from alcohol. One obtains 30 g. of 4-(5-isobutyl-primidinyl-2)-sulfonamidophenyl acetic acid anilid having a melting point of 230° C.

In analogy to example 5, the following compounds are produced with the use of the corresponding starting materials:

| Name | Melting Point in °C. |
|---|---|
| 6. 4-(5-ethoxypyrimidinyl-2)-sulfonamidophenyl acetic acid-(2-methoxy-5-chloranilid) | 194 |
| 7. 4-(5-isobutylpyrimidinyl-2)-sulfonamidophenyl acetic acid-(2,6-dichloranilid) | 237 |
| 8. 4-(5-n-propoxyoyrimidinyl-2)-sulfonamidophenyl acetic acid-(3-chloranilid) | 185 |
| 9. 4-(5-ethylpyrimidinyl-2)-sulfonamidophenyl acetic acid-(2-methyl-5-chloranilid) | 205 |
| 10. 4-(5-isobutylpyrimidinyl-2)-sulfonamidophenyl acetic acid-(3-chloranilid) | 172 |
| 11. 4-(5-n-propoxypyrimidinyl-2)-sulfonamidophenyl acetic acid-(2-methoxy-5-chloranilid) | 162 |
| 12. 4-(5-n-propoxypyrimidinyl-2)-sulfonamidophenyl acetic acid-(3chlor-4-methoxyanilid) | 202 |
| 13. 4-(5-ethylpyrimidinyl-2)-sulfonamidophenyl acetic acid-(2-methoxy-5c-chloranilid) | 229 |
| 14. 4-(5-isobutylpyrimidinyl-2)-sulfonamidophenyl acetic acid-(3-acetylanilid) | 260 |
| 15. 4-(5-methyl-pyrimidinyl-2)-sulfonamidophenyl acetic acid-(3-acetylanilid) | 261 |
| 16. 4-(5-isopropylpyrimidinyl-2)-sulfonamidophenyl acetic acid-(2-methyl-5-chloranilid) | 127 |
| 17. 4-(5-isopropylpyrimidinyl-2)-sulfonamidophenyl acetic acid-(3-trifluoromethylanilid) | 108 |
| 18. 4-(5-isopropylpyrimidinyl-2)-sulfonamidophenyl acetic acid-(2-methoxy-5-chloranilid) | 130 |
| 19. 4-(5-isobutylpyrimidinyl-2)-sulfonamidophenyl acetic acid-(2-methyl-5-chloranilid) | 148 |
| 20. 4-(5-isopropoxypyrimidinyl-2)-sulfonamidophenyl acetic acid-(3-chlor-4-methylanilid) | 192 |
| 21. 4-(5-isobutylpyrimidinyl-2)-sulfonamidophenyl acetic acid-(2-chloro-6-methylanilid) | 208 |
| 22. 4-(5-isopropoxypyrimidinyl-2)-sulfonamidophenyl acetic acid-(2-methyl-3-chloranilid) | 169 |
| 23. 4-(5-isopropoxypyrimidinyl-2)-sulfonamidophenyl acetic acid-(3-chloro-4-methoxyanilid) | 235 |
| 24. 4-(5-isopropoxypyrimidinyl-2)-sulfonamidophenyl acetic acid-(2-chloro-6-methylanilid) | 196 |
| 25. 4-(5-n-butoxypyrimidinyl-2)-sulfonamido-beta-phenyl-propionic acid anilid | 184 |
| 26. 4-(5-isopropoxypyrimidinyl-2)-sulfonamido-beta-phenyl-propionic acid-(4-chloranilid) | 185 |
| 27. 4-(5-isopropoxypyrimidinyl-2)-sulfonamido-beta-phenyl-propionic acid-(2-methoxy-5-chloranilid) | 168 |
| 28. 4-(5-isopropoxypyrimidinyl-2)-sulfonamido-beta-phenyl-propionic acid-(2-methyl-4-chloranilid) | 168 |
| 29. 4-(5-methylpyrimidinyl-2)-sulfonamidophenyl acetic acid-(4-chloranilid) | 248 |
| 30. 4-(5-methylpyrimidinyl-2)-sulfonamidophenyl acetic acid-(2-methoxy-5-chloranilid) | 220 |
| 31. 4-(5-isopropoxypyrimidinyl-2)-sulfonamido-beta-phenyl propionic acid anilid | 207 |
| 32. 4-(5-isobutylpyrimidinyl-2)-sulfonamidophenyl acetic acid-(4-chloranilid) | 230 |
| 33. 4-(5-isoburylpyrimidinyl-2)-sulfonamidophenyl acetic acid-(2-methoxy-5-chloranilid) | 197 |
| 34. 4-(5-methylpyrimidinyl-2)-sulfonamidophenyl acetic acid anilid | 244 |
| 35. 4-(5-isopropoxypyrimidinyl-2)-sulfonamidophenyl acetic acid-(2-methyl-5-chloranilid) | 177 |
| 36. 4-(5-isopropoxypyrimidinyl-2)-sulfonamidophenyl acetic acid-(4-methoxyanilid) | 211 |
| 37. 4-(5-isopropoxypyrimidinyl-2)-sulfonamidophenyl acetic acid-(2-methoxy-5-chloranilid) | 173 |
| 38. 4-(5-methoxypyrimidinyl-2)-sulfonamidophenyl acetic acid-(2-methoxy-5-chloranilid) | 230 |
| 39. 4-(5-methoxypyrimidinyl-2)-sulfonamidothiophenyl acetic acid-(2-methyl-5-chloranilid) | 243 |
| 40. 4-(5-methoxypyrimidinyl-2)-sulfonamidophenoxy acetic acid-(2-methoxy-5-chloranilid) | 239 |
| 41. 4-(5-isobutylpyrimidinyl-2)-sulfonamidophenyl acetic acid-(2-fluoro-5-methylanilid) | 183 |
| 42. 4-(5-isopropoxypyrimidinyl-2)-sulfonamidophenyl acetic acid (2-methyl-5-isopropylanilid) | 154 |
| 43. 4-(5-methoxypyrimidinyl-2)-sulfonamidophenyl acetic acid-(4-chloro-2,5-dimethoxyanilid) | 235 |
| 44. 4-(5-methoxypyrimidinyl-2)-sulfonamidophenyl acetic acid-(beta-naphthylamide) | 189 |
| 45. 4-(5-cyclohexyloxypyrimidinyl-2)-sulfonamidophenyl acetic acid-(2-methoxy-5-chloranilid) | 225 |
| 46. 4-(5-isobutylpyrimidinyl-2)-sulfonamidophenyl acetic acid-(2-aminocarbonylanilid) | 236 |
| 47. 4-(5cyclopentylpyrimidinyl-2)-sulfonamidophenyl acetic acid-(2-methyl-5-chloranilid) | 198 |
| 48. 4-(5-isopropoxypyrimidinyl-2)-sulfonamidophenyl acetic acid-(5-methylisoxazolyl-3-amide) | 206 |
| 49. 4-(5-isopropoxypyrimidinyl-2)-sulfonamidophenyl acetic acid-(3-methylisoxazolyl-5-amide) | 225 |
| 50. 4-(5-isobutylpyrimidinyl-2)-sulfonamidophenyl acetic acid-(5-phenyl-thiodiazolyl-(1,2)-3-amide) | 236 |

| | |
|---|---|
| 51. 4-(5-methoxypyrimidinyl-2)-sulfonamidophenyl acetic acid-(2-chloro-5-trifluoro-methylanilid) | 198 |
| 52. 4-(5-isobutylpyrimidinyl-2)-sulfonamidophenyl acetic acid-(2-chloro-5-trifluoro-methylanilid) | 163 |
| 53. 4-(5-isopropoxypyrimidinyl-2)-sulfonamidophenyl acetic acid-(4-acetyl-aminoanilid) | 233 |
| 54. 4-(5-methylpyrimidinyl-2)-sulfonamidophenyl acetic acid-(2-trifluoro-methylanilid) | 217 |
| 55. 4-(5-isopropoxypyrimidinyl-2)-sulfonamidophenyl acetic acid-(2,5-dimethoxy-4-chloranilid) | 196 |
| 56. 4-(5-isopropoxypyrimidinyl-2)-sulfonamidophenyl acetic acid-(2,4-dimethoxy-5-chloranilid) | 213 |
| 57. 4-(5-methoxypyrimidinyl-2)-sulfonamidophenyl acetic acid-(2-phenylanilid) | 110 |
| 58. 4-(5-isoamyloxypyrimidinyl-2)-sulfonamidophenyl acetic acid-(2-methoxy-5-chloranilid) | 179 |
| 59. 4-(5-isoamyloxypyrimidinyl-2)-sulfonamidophenyl acetic acid-(2-methyl-5-chloranilid) | 161 |
| 60. 4-(5-isoamyloxypyrimidinyl-2)-sulfonamidophenyl acetic acid-(2-chloro-5-trifluoro-methylanilid) | 160 |
| 61. 4-(5-isopropoxypyrimidinyl-2)-sulfonamidophenyl acetic acid-(2-aminocarbonyl-anilid) | 300 |
| 62. 4-(5-cyclohexyloxypyrimidinyl-2)-sulfonamidophenyl acetic acid-(2-chloro-5-trifluoro-methyl-anilid) | 142 |
| 63. 4-(5-cyclohexyloxypyrimidinyl-2)-sulfonamidophenyl acetic acid-(2-methyl-5-chloranilid) | 196 |
| 64. 4-(5-isopropoxypyrimidinyl-2)-sulfonamidophenyl acetic acid-(beta-napthylamide) | 216 |
| 65. 4-(5-isobutylpyrimidinyl-2)-sulfonamidophenyl acetic acid-(2-benzyloxy-5-chloranilid) | 187 |
| 66. 4-(5-isopropoxypyrimidinyl-2)-sulfonamidophenyl acetic acid-(2-benzyloxy-5-chloranilid) | 211 |
| 67. 4-(5-isobutylpyrimidinyl-2)-sulfonamidophenyl acetic acid-(2-allyloxy-5-chloranilid) | 190 |
| 68. 4-(5-isopropoxypyrimidinyl-2)-sulfonamidophenyl acetic acid-(2-allyloxy-5-chloranilid) | 176 |
| 69. 4-(5-methoxyethoxypyrimidinyl-2)-sulfonamidophenyl acetic acid-(2-methoxy-5-chloranilid) | 120 |
| 70. 4-(5-isobutylpyrimidinyl-2)-sulfonamidophenyl acetic acid-(2-ethoxy-5-chloranilid) | 199 |
| 71. 4-(5-isopropoxypyrimidinyl-2)-sulfonamidophenyl acetic acid-(2-ethoxy-5-chloranilid) | 198 |
| 72. 4-(5-cyclopentylpyrimidinyl-2)-sulfonamidophenyl acetic acid-(2-methoxy-5-chloranilid) | 206 |
| 73. 4-(5-n-amylpyrimidinyl-2)-sulfonamidophenyl acetic acid-(2-methoxy-5-chloranilid) | 184 |
| 74. 4-(5-n-amylpyrimidinyl-2)-sulfonamidophenyl acetic acid-(2-methyl-5-chloranilid) | 348 |
| 75. 4-(5-cyclohexylpyrimidinyl-2)-sulfonamidophenyl acetic acid-(2-methoxy-5-chloranilid) | 217 |
| 76. 4-(5-cyclohexylpyrimidinyl-2)-sulfonamidophenyl acetic acid-(2-methyl-5-chloranilid) | 206 |
| 77. 4-(5-isobutylpyrimidinyl-2)-sulfonamidophenyl acetic acid-(2-methoxy-5-chlorobenzylamide) | 106 |
| 78. 4-(5-isobutylpyrimidinyl-2)-sulfonamidophenyl acetic acid-(5-methoxy-pyrimidinyl-2-amide) | 245 |
| 79. 4-(5-n-butylpyrimidinyl-2)-sulfonamidophenyl acetic acid-(2-methoxy-5-chloranilid) | 193 |
| 80. 4-(5-isopropoxypyrimidinyl-2)-sulfonamidophenyl acetic acid-(2-methoxy-5-chloro-N-methylanilid) | 102 |
| 81. 4-(5-isobutylpyrimidinyl-2)-sulfonamidophenyl acetic acid-(2-methoxy-5-chloro-N-methylanilid) | 186 |
| 82. 4-(5-isobutylpyrimidinyl-2)-sulfonamidophenyl acetic acid-(2,5-dimethoxy-5-chloranilid) | 173 |
| 83. 4-(5-methoxypyrimidinyl-2)-sulfonamidophenyl acetic acid-(thiazolyl-2amide) | 245 |
| 84. 4-(5-isobutylpyrimidinyl-2)-sulfonamidophenyl acetic acid-(thiazolyl-2-amide) | 274 |
| 85. 4-(5-isobutylpyrimidinyl-2)-sulfonamidophenyl acetic acid-(2,4-dimethoxy-5-chloranilid) | 213 |
| 86. 4-(5-isopropoxypyrimidinyl-2)-sulfonamidophenyl acetic acid-(2,4,6-trimethylanilid) | 206 |
| 87. 4-(5-isobutylpyrimidinyl-2)-sulfonamidophenyl acetic acid-(2-methoxy-4-chloro-5-methylanilid) | 198 |
| 88. 4-(5-isopropoxypyrimidinyl-2)-sulfonamidophenyl acetic acid-(2-ethoxy-5-methylanilid) | 165 |
| 89. 4-(5-phenylpyrimidinyl-2)-sulfonamidophenyl acetic acid-(2-methoxy-5-chloranilid) | 216 |
| 90. 4-(5-phenylpyrimidinyl-2)-sulfonamidophenyl acetic acid-(2-methyl-5-chloranilid) | 229 |
| 91. 4-(5-isobutylpyrimidinyl-2)-sulfonamidophenyl acetic acid-(2-methoxy-5-fluorobenzylamide) | 127 |
| 92. 4-(5-isobutylpyrimidinyl-2)-sulfonamidophenyl aceti:acid-(2-methoxy-5-fluoro-N-methylbenzylamide) | 98 |
| 93. 4-(5-isobutylpyrimidinyl-2)-sulfonamidophenyl acetic acid-(2-methoxy-5-chloro-N-methylbenzylamide) | 103 |
| 94. 4-(5-isobutylpyrimidinyl-2)-sulfonamidophenyl acetic acid-(2-methoxy-5-methylanilid) | 218 |
| 95. 4-(5-isobutylpyrimidinyl-2)-sulfonamidophenyl acetic acid-(2-methoxy-5-fluoroanilid) | 193 |
| 96. 4-(5-isobutylpyrimidinyl-2)-sulfonamidophenyl acetic acid-(2-ethoxy-5-methylanilid) | 190 |
| 97. 4-(5-isopropoxypyrimidinyl-2)-sulfonamidophenyl acetic acid-(2-methoxy-5-methylanilid) | 180 |
| 98. 4-(5-isopropoxypyrimidinyl-2)-sulfonamidophenyl acetic acid-(2-methoxy-5-fluoroanilid | 166 |
| 99. 4-(5-isobutylpyrimidinyl-2)-sulfonamidophenyl acetic acid-(2-methoxy-5-chlorobenzylamide) | 106 |

EXAMPLE 100

Thirty g. of 4-(5-isobutylpyrimidinyl-2)-sulfonamidophenyl acetic acid-(2-methoxy-5-chloranilid) are dissolved together with 2.5 g. of sodium hydroxide of 100 ml. of methyl glycol. The solution, filtered clear, is then diluted with 500 ml. of isopropanol and the precipitated salt is suctioned off, washed with isopropanol and dried at 100° C.

EXAMPLE 101

Analogously, to example 100, one obtains from 4-(5-isopropoxypyrimidinyl-2)-sulfonamidophenyl acetic acid-(2-methoxy-5-chloranilid) and sodium hydroxide the 4-(5-isopropoxypyrimidinyl-2)-sulfonamidophenyl acetic acid-(2-methoxy-5-chloranilid) sodium having a melting point of 248° C.

EXAMPLE 102

Five g. of 4-(5-isobutylpyrimidinyl-2)-sulfonamidophenyl acetic acid-(2-methoxy-5-chloranilid) are dissolved hot in about 100 ml. of water by addition of ammonia solution. Then a solution of 400 mg. of calcium hydroxide of 100 ml. of H$_2$O is added. The precipitate is suctioned off and washed with water. After drying at 100° C. the 4-(5-isobutylpyrimidinyl-2)-sulfonamidophenyl acetic acid-(2-methoxy-5-chloranilid) calcium thus obtained melts at 280° C.
Yield: 4.1 g.

EXAMPLE 103

Five g. of 4-(5-cyclohexylpyrimidinyl-2)-sulfonamidophenyl acetic acid-(2-methoxy-5-chloranilid) are dissolved in 100 ml. of alcohol by addition of a solution of 1.5 g. of n-butyl biguanide in ethanol. The solution obtained is evaporated to dryness and the residue recrystallized from benzene. One obtains the biguanide salt of the compound referred to, having a melting point of 163° C., in a yield of 3.5 g.

EXAMPLE 104

From 5 g. of 4-(5-methoxyethoxypyrimidinyl-2)-sulfonamidophenyl acetic acid-(2-methoxy-5-chloranilid) one obtains analogously to example 103 with ethanolamine 3 g. of the ethanolamine salt having a melting point of 145°–148° C.

It will be noted from the foregoing description and illustrative examples that novel blood-sugar-lowering agents are provided, and that methods for their preparation are given.

I claim:
1. A compound which is a sulfonylamino pyrimidine derivative of the formula

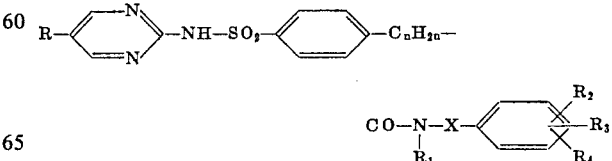

wherein R is lower alkyl, lower alkoxy, lower-alkoxy-lower-alkoxy, cycloalkyl or cycloalkoxy having five or six carbon atoms, or phenyl;
R$_1$ is hydrogen or lower alkyl;
R$_2$, R$_3$, and R$_4$ are members of the group consisting of hydrogen, lower alkyl, lower alkoxy, lower alkanoyl, lower alkanoylamino, trifluoromethyl, halogen, aminocarbonyl, benzyloxy, lower alkenyloxy, and phenyl;
n is 1 or 2; and X is a carbon-to-carbon bond or CH$_2$, or a salt of said derivative with a physiologically tolerated base.

2. A compound as set forth in claim 1, wherein said derivative is
4-(5-isopropylpyrimidin-2-yl)-sulfonamido-phenylacetic acid 2-methoxy-5-chloroanilide.

3. A compound as set forth in claim 1, wherein said derivative is
4-(5-isobutylpyrimidin-2-yl)-sulfonamido-phenylacetic acid 2-methyl-5-chloroanilide.

4. A compound as set forth in claim 1, wherein said derivative is
4-(5-methylpyrimidin-2-yl)-sulfonamido-phenylacetic acid 2-methoxy-5-chloroanilide.

5. A compound as set forth in claim 1, wherein said derivative is
4-(5-isopropoxypyrimidin-2-yl)-sulfonamido-phenylacetic acid 2-methoxy-5-chloroanilide.

6. A compound as set forth in claim 1, wherein said derivative is
4-(5-isobutylpyrimidin-2-yl)-sulfonamido-phenylacetic acid 2-ethoxy-5-chloroanilide.

7. A compound as set forth in claim 1, wherein said derivative is
4-(5-isobutylpyrimidin-2-yl)-sulfonamido-phenylacetic acid 2-methoxy-5-chloro-N-methylanilide.

8. A compound as set forth in claim 1, wherein said derivative is
4-(5-isopropoxypyrimidin-2-yl)-sulfonamido-phenylacetic acid 2-ethoxy-5-methylanilide.

9. A compound as set forth in claim 1, wherein said derivative is
4-(5-isobutylpyrimidin-2-yl)-sulfonamido-phenylacetic acid 2-methoxy-5-chloroanilide.

10. A compound as set forth in claim 1, wherein said derivative is
4-(5-isobutylpyrimidin-2-yl)-sulfonamido-phenylacetic acid 2-methoxy-5-fluoroanilide.

11. A compound as set forth in claim 1, wherein said derivative is
4-(5-isobutylpyrimidin-2-yl)-sulfonamido-phenylacetic acid 2-ethoxy-5-methylanilide.

12. A compound as set forth in claim 1, wherein said derivative is
4-(5-isopropoxypyrimidin-2-yl)-sulfonamido-phenylacetic acid 2-methoxy-5-methylanilide.

13. A compound as set forth in claim 1, wherein said derivative is
4-(5-ethylpyrimidin-2-yl)-sulfonamido-phenylacetic acid 2-methoxy-5-chloroanilide.

* * * * *